United States Patent
Wang et al.

(10) Patent No.: US 7,707,032 B2
(45) Date of Patent: Apr. 27, 2010

(54) METHOD AND SYSTEM FOR MATCHING SPEECH DATA

(75) Inventors: Jhing-Fa Wang, Tainan (TW); Po-Chuan Lin, Tainan (TW); Li-Chang Wen, Sanchong (TW)

(73) Assignee: National Cheng Kung University, Tainan (TW)

( * ) Notice: Subject to any disclaimer, the term of this patent is extended or adjusted under 35 U.S.C. 154(b) by 1224 days.

(21) Appl. No.: 11/253,636

(22) Filed: Oct. 20, 2005

(65) Prior Publication Data

US 2007/0094020 A1  Apr. 26, 2007

(51) Int. Cl.
*G10L 15/10* (2006.01)
*G10L 15/12* (2006.01)

(52) U.S. Cl. .................. 704/236; 704/238; 704/231; 704/251

(58) Field of Classification Search .................. 704/238, 704/239, 241, 236, 231, 251
See application file for complete search history.

(56) References Cited

U.S. PATENT DOCUMENTS

| | | | | |
|---|---|---|---|---|
| 5,271,088 A | * | 12/1993 | Bahler | 704/200 |
| 5,903,864 A | * | 5/1999 | Gadbois et al. | 704/251 |
| 6,260,013 B1 | * | 7/2001 | Sejnoha | 704/240 |
| 6,535,850 B1 | * | 3/2003 | Bayya | 704/239 |
| 6,684,185 B1 | * | 1/2004 | Junqua et al. | 704/243 |
| 7,006,970 B2 | * | 2/2006 | Jinnai et al. | 704/239 |
| 2003/0033152 A1 | * | 2/2003 | Cameron | 704/275 |
| 2004/0193408 A1 | * | 9/2004 | Hunt | 704/209 |
| 2005/0187767 A1 | * | 8/2005 | Godden | 704/238 |
| 2005/0187768 A1 | * | 8/2005 | Godden | 704/238 |

FOREIGN PATENT DOCUMENTS

TW  430779  4/2001

OTHER PUBLICATIONS

Chia-Hung HSU, "DSP Based Hand written Number and Pattern Recognition System," 2003 and English Abstract of Thesis.

* cited by examiner

*Primary Examiner*—David R Hudspeth
*Assistant Examiner*—Abdelali Serrou

(57) ABSTRACT

A method and system used to determine the similarity between an input speech data and a sample speech data is provided. First, the input speech data is segmented into a plurality of input speech frames and the sample speech data is segmented into a plurality of sample speech frames. Then, the input speech frames and the sample speech frames are used to build a matching matrix, wherein the matching matrix comprises the distance values between each of the input speech frames and each of the sample speech frames. Next, the distance values are used to calculate a matching score. Finally, the similarity between the input speech data and the sample speech data is determined according to this matching score.

12 Claims, 4 Drawing Sheets

METHOD AND SYSTEM FOR MATCHING SPEECH DATA

BACKGROUND

1. Field of Invention

The present invention relates to a matching method and system. More particularly, the present invention relates to a method and system for determining the similarity between two speech data.

2. Description of Related Art

Progress in the design and manufacture of electronic devices has continuously improved the capability and quality of various electronic devices and has also diversified user interfaces for these devices. Presently, in addition to command inputting via keyboards and mice, the electronic device, such as a personal computer (PC) or a personal digital assistant (PDA), can be controlled by touch and speech. Speech controlling especially is one of the major developments in electronics.

Speech control enables a user to command an electronic device to perform a certain operation by speaking a certain sentence. Therefore, the electronic device must be capable of identifying the command issued from the user. In general, several sample speech data are stored in the electronic device in advance, wherein each of the sample speech data corresponds to one operation. When the electronic device receives the command spoken from the user, the electronic device transforms the speech command into an input speech data. Next, the input speech data is matched to the most similar sample speech data, and the operation corresponding to the chosen sample speech data is carried out by the electronic device.

In the foregoing basic concept of speech control, matching the input speech data with the sample speech data in the electronic device is very important; the electronic device requires an accurate matching technique in order to operate correctly. Hence, the speech data matching technique is one of the critical techniques of speech control.

A single chip microprocessor is used to carry out the operation of speech processing and speech data matching in some speech control techniques. However, the speech data matching process generally requires a large operating overhead because the complicated speech data matching process is hard to accomplish by the single chip microprocessor, which is weak in operational capability. The problem may be solved by using a digital signal processor, which is strong in operational capability, or a special speech processing circuit to perform matching, but the required system memory, production cost and product price will also increase.

Therefore, a simple and effective speech data matching method and system is needed for the speech control technique to be implemented on various electronic devices more easily.

SUMMARY

It is therefore an objective of the present invention to provide a method and system for determining the similarity between fragments of speech.

It is another objective of the present invention to provide a speech data matching method and system which are easily implemented in any electronic device.

It is still another objective of the present invention to provide a speech data matching method and system for reducing the cost of a speech control system.

It is another objective of the present invention to provide a speech data matching method and system for reducing the operational load in a speech control system.

According to the foregoing objectives of the invention, a speech data matching method according to an embodiment of the present invention is used to determine the similarity between an input speech data and a sample speech data. First, the input speech data is segmented into several input speech frames with the same size; and the sample speech data is segmented into several sample speech frames with the same size. Then, the input speech frames and the sample speech frames are used to build a matching matrix that includes several distance values individually indicating the distance between each of the input speech frames and each of the sample speech frames. Next, the distance values are used to calculate a matching score. Finally, the matching score is used to determine whether the sample speech data is similar to the input speech data.

The foregoing method can be accomplished by a speech data matching system implemented by hardware circuitry or software programs. The speech data matching system includes a speech data segmenting module, a matching matrix building module, a score calculating module and a matching determining module. The speech data segmenting module is used to receive an input speech data and a sample speech data. Then, the input speech data is segmented into several input speech frames with the same size; and the sample speech data is segmented into several sample speech frames with the same size. The matching matrix building module is used to build a matching matrix by the input speech frames and the sample speech frames, and the matching matrix includes several distance values individually indicating the distance between each of the input speech frames and each of the sample speech frames. The matching score calculating module is used to calculate a matching score by the distance values in the matching matrix. The matching determining module is used to determine whether the input speech data is similar to the sample speech data according to the matching score.

BRIEF DESCRIPTION OF THE DRAWINGS

These and other features, aspects and advantages of the present invention will become better understood with regard to the following description, appended claims and accompanying drawings, where:

DESCRIPTION OF THE PREFERRED EMBODIMENTS

Figure 1:
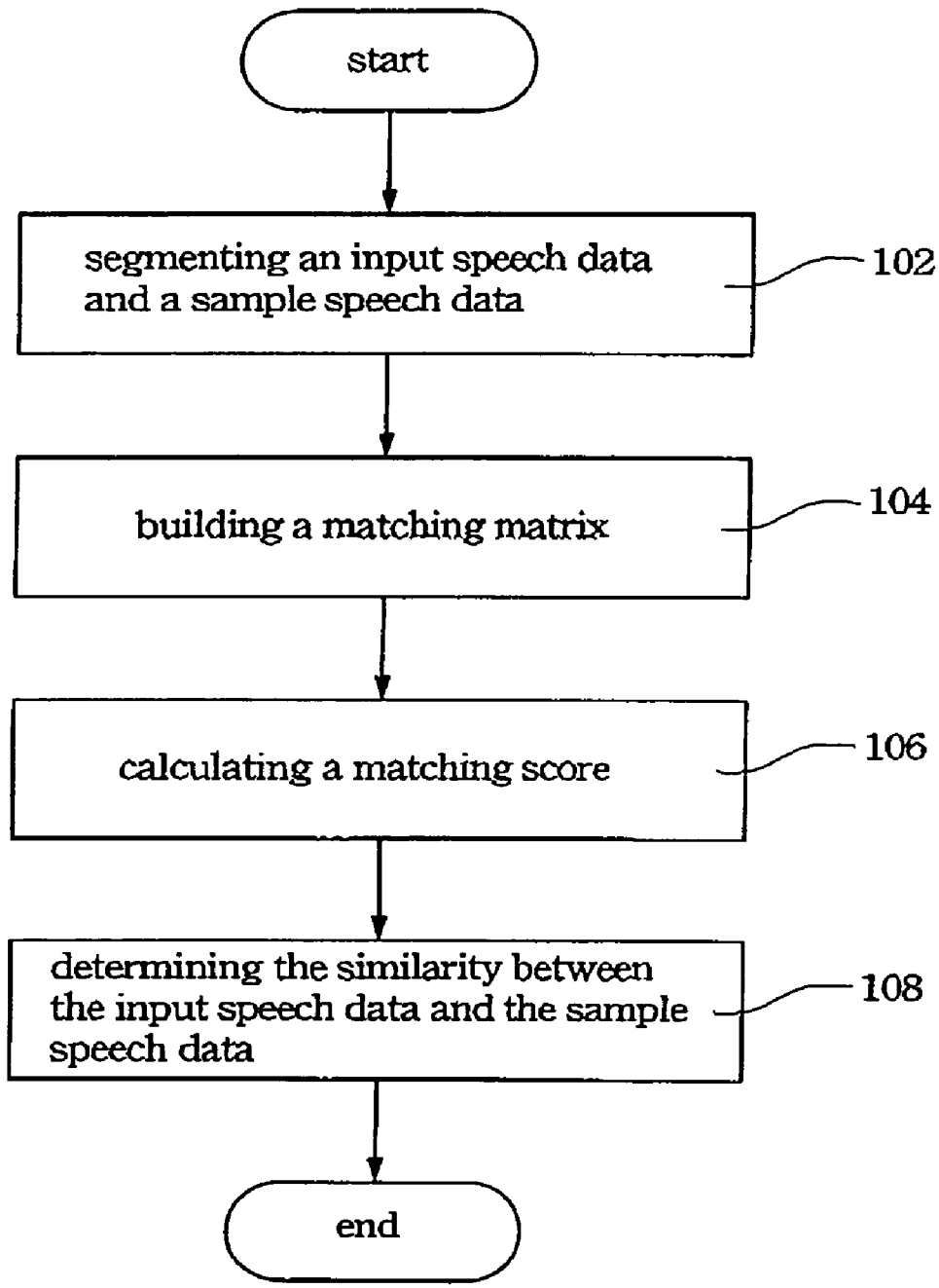
FIG. 1 is a flow chart of the speech data matching method according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a step flow 100 of the speech data matching method according to an embodiment of the present invention. The method can be carried out in an electronic device for determining the similarity between an input speech data and a sample speech data and whether the input speech data matches the sample speech data. The input speech data may be obtained by converting a spoken signal, and the sample speech data may be stored in the electronic device in advance.

In the step 102, the input speech data is segmented into several input speech frames with the same size, and the sample speech data is segmented into several sample speech frames with the same size. In the step 104, the input speech frames and the sample speech frames produced in the step 102 are used to build a matching matrix. Each of the elements of the matching matrix is a distance value indicating the distance between one of the input speech frames and one of the sample speech frames. In other words, the matching matrix includes several distance values individually indicating the distance between each of the input speech frames and each of the sample speech frames. Next, the distance values are used to calculate a matching score. Finally, the matching score is used to determine whether the sample speech data is similar to the input speech data.

Figures 2, 3:
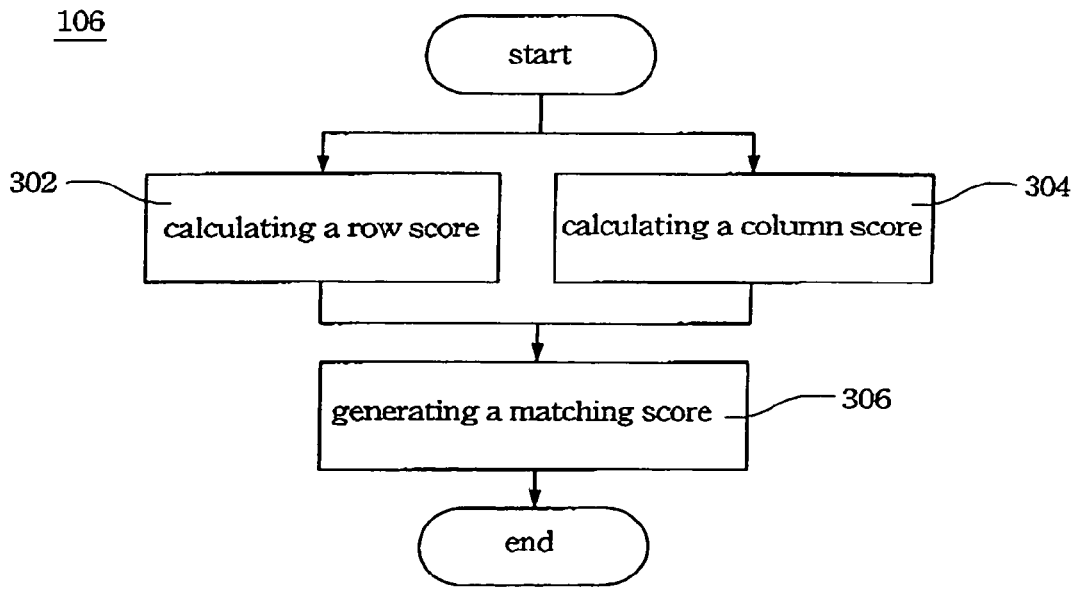
FIG. 2 is a matching matrix used in the speech data matching method according to an embodiment of the present invention.
FIG. 3 is a flow chart of a matching score calculating process used in the speech data matching method according to an embodiment of the present invention.

A matching matrix 200 built in the embodiment is exemplified in FIG. 2. Assuming that the input speech data is segmented into c frames from $IF_1$, $IF_2$ ... to $IF_c$ and the sample speech data is segmented into r frames from $SF_1$, $SF_2$ ... to $SF_r$ in the step 102, the c input speech frames are a horizontal axis and the r sample speech frames are a vertical axis to build a matching matrix 200 in the step 104 of the embodiment. Each of the elements of the matching matrix corresponds to one of the input speech frames and one of the sample speech frames; and each of the elements of the matching matrix, namely the distance value, indicates the distance between the corresponding input speech frame and the corresponding sample speech frame. For example, the distance value between input speech frame $IF_2$ and sample speech frame $SF_4$ is $DV_{24}$, and the distance value between input speech frame $IF_c$ and sample speech frame $SF_r$ is $DV_{cr}$. The described distance values herein may be obtained by any calculation for the distance between one of the input speech frames and one of the sample speech frames, such as by the dynamic timing warping (DTW) calculation.

Referring again to FIG. 1, after the matching matrix is built in the step 104, a matching score is calculated in the step 106 by using the several distance values in the matching matrix. Finally, it can be determined whether the input speech data is similar to the sample speech data according to the matching score and whether the sample speech data is most similar to the input speech data can be further determined.

FIG. 3 shows a flow chart of a method for calculating the matching score in this embodiment, that is, the method carried out in the step 106 shown in FIG. 1. In the method, the steps 302 and 304 are successively or simultaneously carried out for a row score calculating process and a column score calculating process of the matching matrix 200.

Referring to FIG. 2 and FIG. 3, in the row score calculating process of the step 302, the simplest way is to find out the minimum distance value in each row of the matching matrix 200, and then the row score can be obtained by summing these minimum distance values. For example, the matching matrix 200 has r rows, and assuming that the minimum distance value in each row respectively is $DV_{31}$, $DV_{22}$, $DV_{43}$, $DV_{44}$, $DV_{c5}$ ... and $DV_{1r}$, the row score is equal to the sum of these minimum distance values. The formula for this row calculating process is:

$$\text{row score} = \sum_{j=1}^{r} \min_{i \in C}[MM(i, j)]$$

where MM(l,j) is the expression of the matching matrix 200 and the parameters i and j respectively indicate the horizontal coordinate and the vertical coordinate of the matching matrix 200.

A simple calculation of the row score in this embodiment is shown as the foregoing description, but some other calculations may be used to improve the accuracy of matching. For example, in addition to the minimum distance value, the second least distance value in each row of the matching matrix 200 may be joined into the calculation of the row score; thus, the row score can be obtained by summing these minimum distance values and second least distance values. The formula for this row calculating process is:

$$\text{row score} = \sum_{j=1}^{r} \min_{i' \in C}[MM(i, j)] + \sum_{j=1}^{r} \min_{i \in C-i'}[MM(i, j)]$$

Moreover, the minimum distance value and the second least distance value in each row of the matching matrix 200 may be further multiplied by a first weighted value and a second weighted value respectively for differentiating the influence caused by the minimum distance value and the second least distance value on the row score, that is:

$$\text{row score} = \alpha \sum_{j=1}^{r} \min_{i' \in C}[MM(i, j)] + (1-\alpha) \sum_{j=1}^{r} \min_{i \in C-i'}[MM(i, j)]$$

where the values $\alpha$ and $(1-\alpha)$ are the first weighted value and the second weighted value, respectively. In general, the first weighted value is larger than the second weighted value.

Referring to FIG. 2 and FIG. 3, the way of calculating the column score of the step 304 is similar to the row score calculating process of the step 302. The simplest way is to find out the minimum distance value in each column of the matching matrix 200, and then the column score can be obtained by summing these minimum distance values. For example, the matching matrix 200 has c columns, and assuming that the minimum distance value in each column respectively is $DV_{15}$, $DV_{21}$, $DV_{34}$, $DV_{4r}$, ... and $DV_{c2}$, the column score is equal to the sum of these minimum distance values. The formula for this row calculating process is:

$$\text{column score} = \sum_{i=1}^{c} \min_{j \in R}[MM(i, j)]$$

where MM(l,j) is the expression of the matching matrix 200 and the parameters i and j respectively indicate the horizontal coordinate and the vertical coordinate of the matching matrix 200.

As with calculating the row score, in addition to the minimum distance value, the second least distance value in each column of the matching matrix 200 may be joined into the calculation of the column score; thus, the column score can be obtained by summing these minimum distance values and second least distance values. The formula for this column calculating process is:

$$\text{column score} = \sum_{i=1}^{c} \min_{j' \in R}[MM(i,j)] + \sum_{i=1}^{c} \min_{j \in R-j'}[MM(i,j)]$$

Moreover, the minimum distance value and the second least distance value in each column of the matrix 200 may be further multiplied by a third weighted value and a fourth weighted value respectively for differentiating the influence caused by the minimum distance value and the second least distance value on the column score, that is:

$$\text{column score} = \beta \sum_{i=1}^{c} \min_{j' \in R}[MM(i,j)] + (1-\beta) \sum_{i=1}^{c} \min_{j \in R-j'}[MM(i,j)]$$

where the values $\beta$ and $(1-\beta)$ are the third weighted value and the fourth weighted value respectively. In general, the third weighted value is larger than the fourth weighted value.

After the row score and the column score are respectively obtained in the steps 302 and 304, the matching score can be finally obtained in the step 306. A simple way to calculate the matching score is by summing the row score and the column score. Similarly, the row score and the column score may be further multiplied by a fifth weighted value and a sixth weighted value, respectively, for differentiating the influence caused by the row score and the column score on the matching score. Moreover, the row score or the column score may be multiplied by a normalization parameter for maintaining the accuracy of the matching score when the quantity of input speech frames is excessively greater than that of the sample speech frames, such as:

matching score=λ×column score+(1−λ)(c/r)×row score where the values λ and (1−λ) are the fifth weighted value and the sixth weighted value respectively and (c/r) is the normalization parameter in this embodiment. When the number of input speech frames is greater than the number of sample speech frames, (c/r) has a weighted value of less than 1; otherwise (c/r) has a weighted value of more than 1. Similarly, the normalization parameter may be (r/c) and multiplies the column score.

Figure 4:
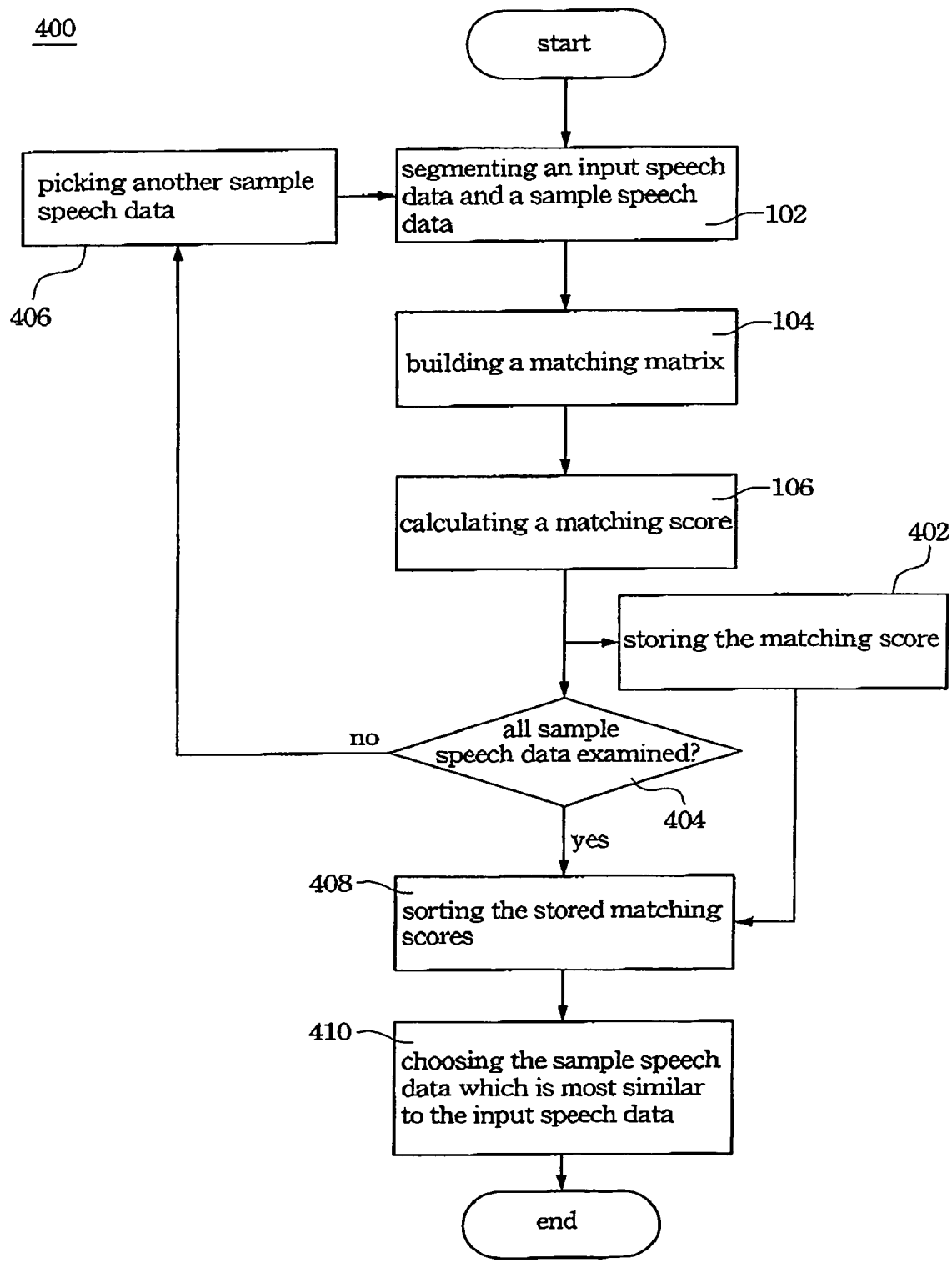
FIG. 4 is a flow chart of the speech data matching method according to another embodiment of the present invention.

FIG. 4 shows a step flow 400 of the method according to another embodiment of the present invention. The step flow 400 may be used in an electronic device for finding, in several sample speech data, a sample speech data that is most similar to an input speech data. The steps 102, 104 and 106 shown in FIG. 4 are the same as those shown in FIG. 1.

In the step 402, every matching score produced from the step 106 is stored. In the step 404, whether the input speech data has been compared with all of the sample speech data is determined. If the result of the step 404 is "no", another sample speech data must be picked in the step 406 for comparing with the input speech data in the step 406 and then producing another matching score. If the result of the step 404 is "yes", the comparing process is finished and the several stored matching scores can be sorted in the step 408. Finally, the sample speech data that is most similar to the input speech data can be chosen in the step 410 according to the sorting result of the step 408.

Figure 5:
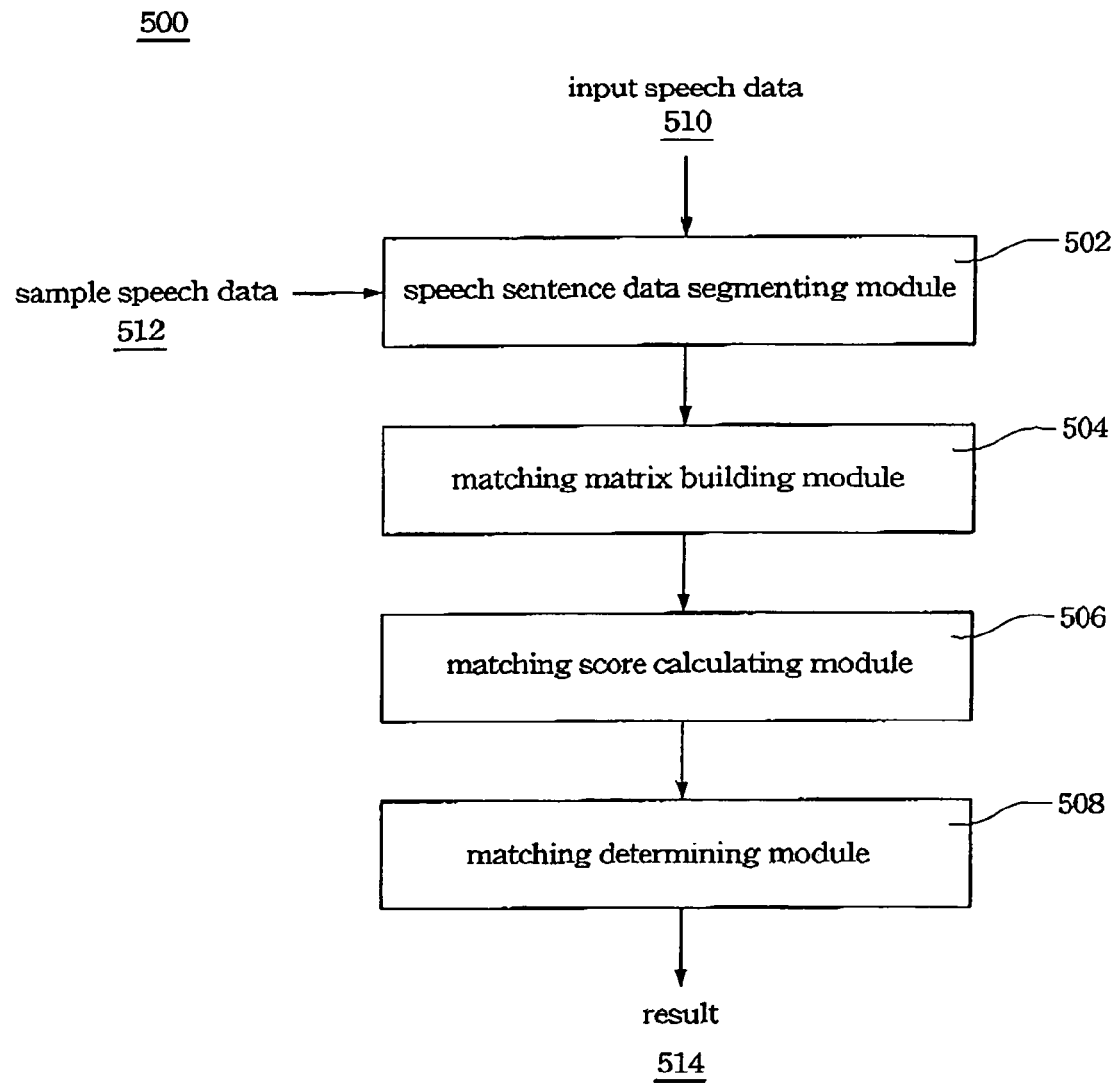
FIG. 5 is an organization of the speech data matching system according to an embodiment of the present invention.

The step flow 100 shown in FIG. 1 can be implemented by any hardware circuitry or software program. Accordingly, an organization of the matching system 500 according to an embodiment of the present invention is shown in FIG. 5. The matching system 500 includes a speech data segmenting module 502, a matching matrix building module 504, a matching score calculating module 506 and a matching determining module 508.

The speech data segmenting module 502 is used to receive an input speech data 510 and a sample speech data 512 and then segment the input speech data 510 into several input speech frames and segment the sample speech data 512 into several sample speech frames. The input speech data 510 may be inputted from a user and the sample speech data 512 may be fetched from a memory module (not shown in the figure). The matching matrix building module 504 is used to build a matching matrix, such as the matching matrix 200 shown in FIG. 2, by the input speech frames and the sample speech frames produced by the speech segmenting module 502. The matching score calculating module 506 is used to calculate a matching score by the matching matrix and a calculating process such as the calculating process shown in FIG. 3. The matching determining module 508 is used to determine whether the input speech data 510 is similar to the sample speech data 510 according to the matching score produced from the matching score calculating module 506 and then output a result 514.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for matching speech data used to determine the similarity between an input speech data and a sample speech data, the method comprising:
   segmenting the input speech data into a plurality of input speech frames;
   segmenting the sample speech data into a plurality of sample speech frames;
   building a matching matrix, wherein each element of the matching matrix corresponds to one of the input speech frames and one of the sample speech frames and indicates a distance value between the corresponding input speech frame and the corresponding sample speech frame;
   determining a minimum value of the distance values indicated in each row of elements of the matching matrix, thereby obtaining a plurality of minimum distance values of the respective rows of elements of the matching matrix, determining a second least value of the distance values indicated in each row of elements of the matching matrix, thereby obtaining a plurality of second least distance values of the respective rows of elements of the matching matrix;
   summing up the minimum distance values and the second least distance value of the distance values indicated in each row of elements of the matching matrix, thereby obtaining a row score, determined by:

$$\text{row score} = \sum_{j=1}^{r} \min_{r \otimes C}[MM(i, j)] + \sum_{j=1}^{r} \min_{r \otimes C - i^c}[MM(i, j)];$$

determining a minimum value of the distance values indicated in each column of elements of the matching matrix, thereby obtaining a plurality of another minimum distance values of the respective columns of elements of the matching matrix, determining a second least value of the distance values indicated in each column of elements of the matching matrix, thereby obtaining a plurality of second least distance values of the respective columns of elements of the matching matrix;

summing up the another minimum distance values and the second least value of the indicated distance values in each column of elements of the matching matrix distance values, thereby obtaining a column score, wherein:

$$\text{column score} = \sum_{i=1}^{e} \min_{j \in R}[MM(i, j)] + \sum_{i=1}^{e} \min_{j \in R - j^k} [MM(i, j)];$$

calculating a matching score obtained by combining the distance row score and the column score; and determining whether the input speech data and the sample speech data are similar according to the matching score.

2. The method as claimed in claim 1, wherein the distance values indicated in the matching matrix are obtained by the dynamic timing warping (DTW) calculation.

3. The method as claimed in claim 1, wherein the row score is equal to a first product plus a second product, and the first product is equal to a first weighted value multiplied by the sum of the minimum distance values and the second product is equal to a second weighted value multiplied by the second least distance values.

4. The method as claimed in claim 3, wherein the first weighted value is larger than the second weighted value.

5. The method as claimed in claim 1, wherein the column score is equal to a first product plus a second product, and the first product is equal to a third weighted value multiplied by the sum of the another minimum distance values, the second product is equal to a fourth weighted value multiplied by the sum of the second least distance values.

6. The method as claimed in claim 5, wherein the third weighted value is larger than the fourth weighted value.

7. The method as claimed in claim 1, wherein the matching score is equal to the sum of the row score and the column score.

8. The method as claimed in claim 1, wherein the matching score is equal to the product of the column score and a fifth weighted value, plus the product of the row score and a sixth weighted value.

9. The method as claimed in claim 1, wherein the matching score is equal to the product of the column score and a fifth weighted value plus the product of the row score, a sixth weighted value and a normalization parameter.

10. The method as claimed in claim 9, wherein the normalization parameter is equal to the amount of elements in each row of the matching matrix divided by the amount of elements in each column of the matching matrix.

11. The method as claimed in claim 1, wherein the matching score is equal to the product of the column score, a fifth weighted value and a normalization parameter, plus the product of the row score and a sixth weighted value.

12. The method as claimed in claim 11, wherein the normalization parameter is equal to the amount of elements in each column of the matching matrix divided by the amount of elements in each row of the matching matrix.

* * * * *